April 24, 1962 G. SLAYTER 3,030,659
APPARATUS FOR PRODUCING FIBERS
Filed Dec. 29, 1958 5 Sheets-Sheet 1

INVENTOR.
GAMES SLAYTER
BY
ATTORNEYS

April 24, 1962 G. SLAYTER 3,030,659
APPARATUS FOR PRODUCING FIBERS
Filed Dec. 29, 1958 5 Sheets-Sheet 2

INVENTOR.
GAMES SLAYTER
BY
ATTORNEYS

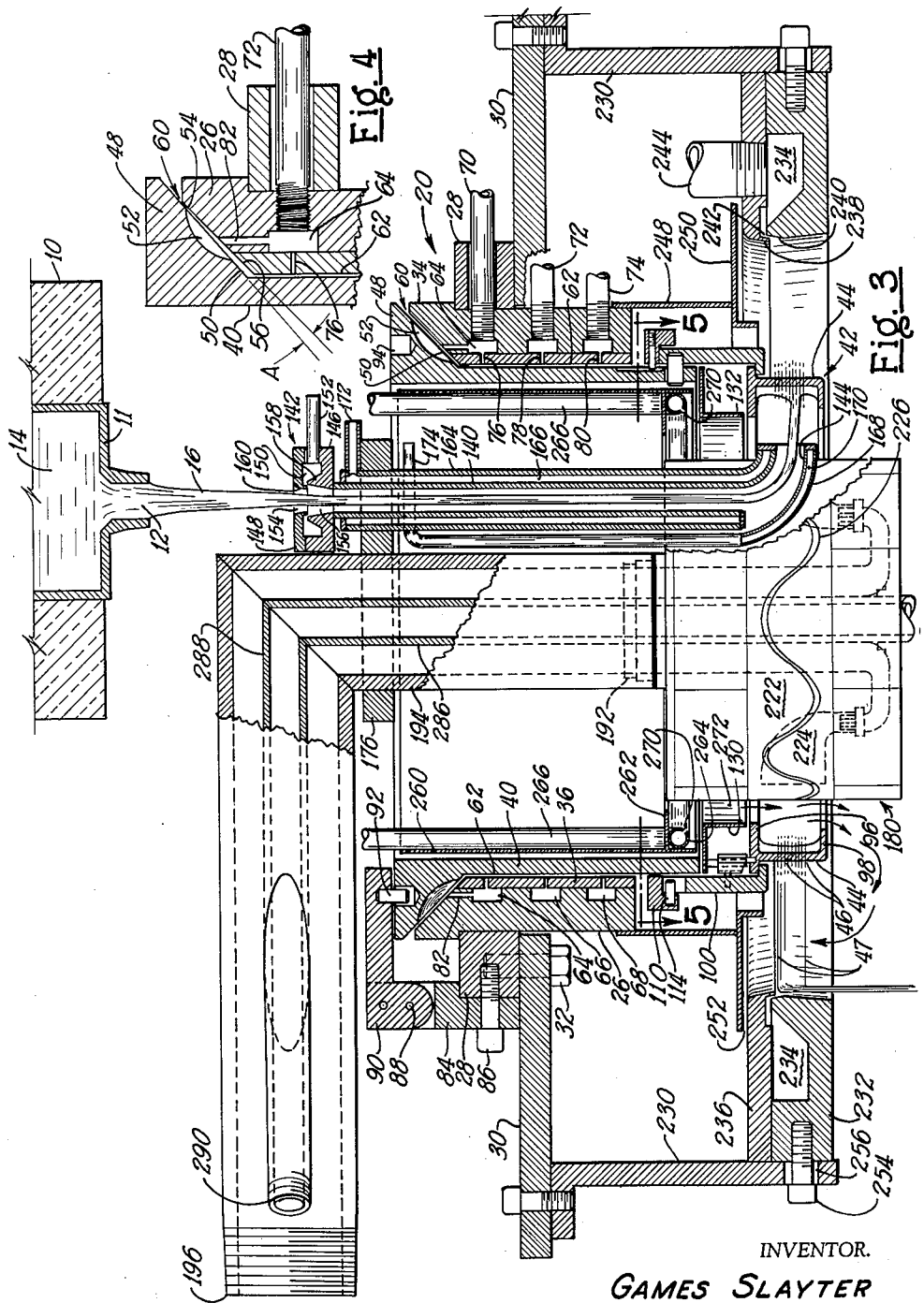

April 24, 1962
G. SLAYTER
3,030,659
APPARATUS FOR PRODUCING FIBERS
Filed Dec. 29, 1958
5 Sheets-Sheet 4
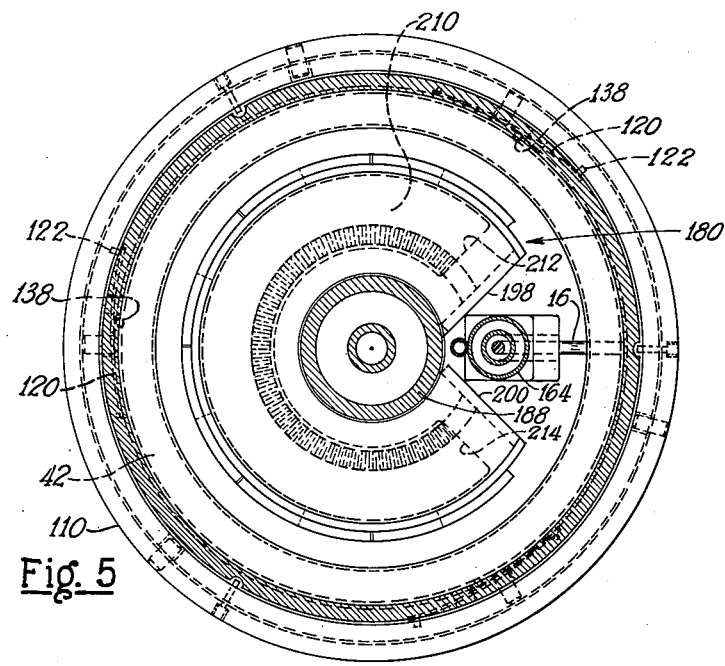
Fig. 5
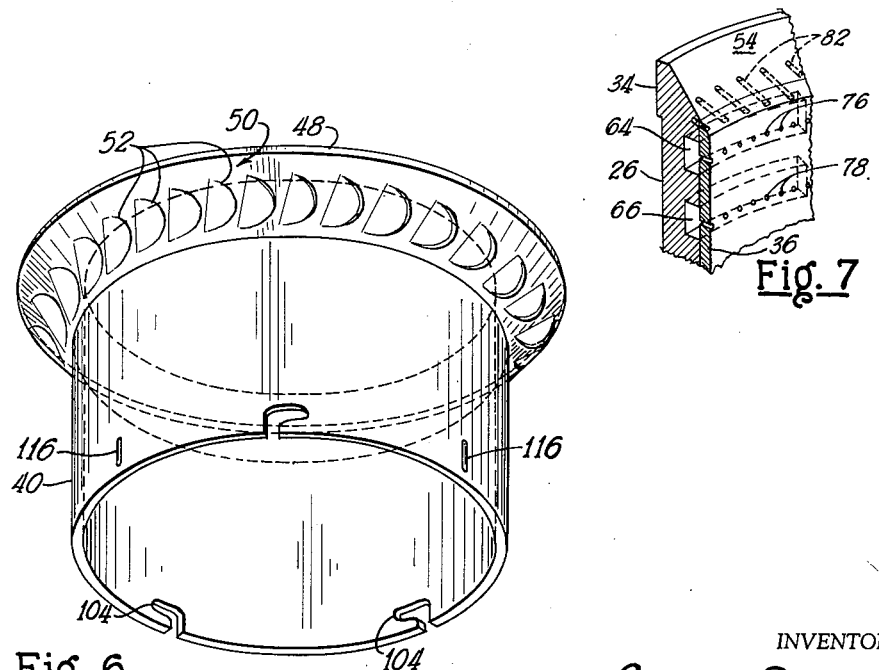
Fig. 6
Fig. 7
INVENTOR.
GAMES SLAYTER
BY
ATTORNEYS

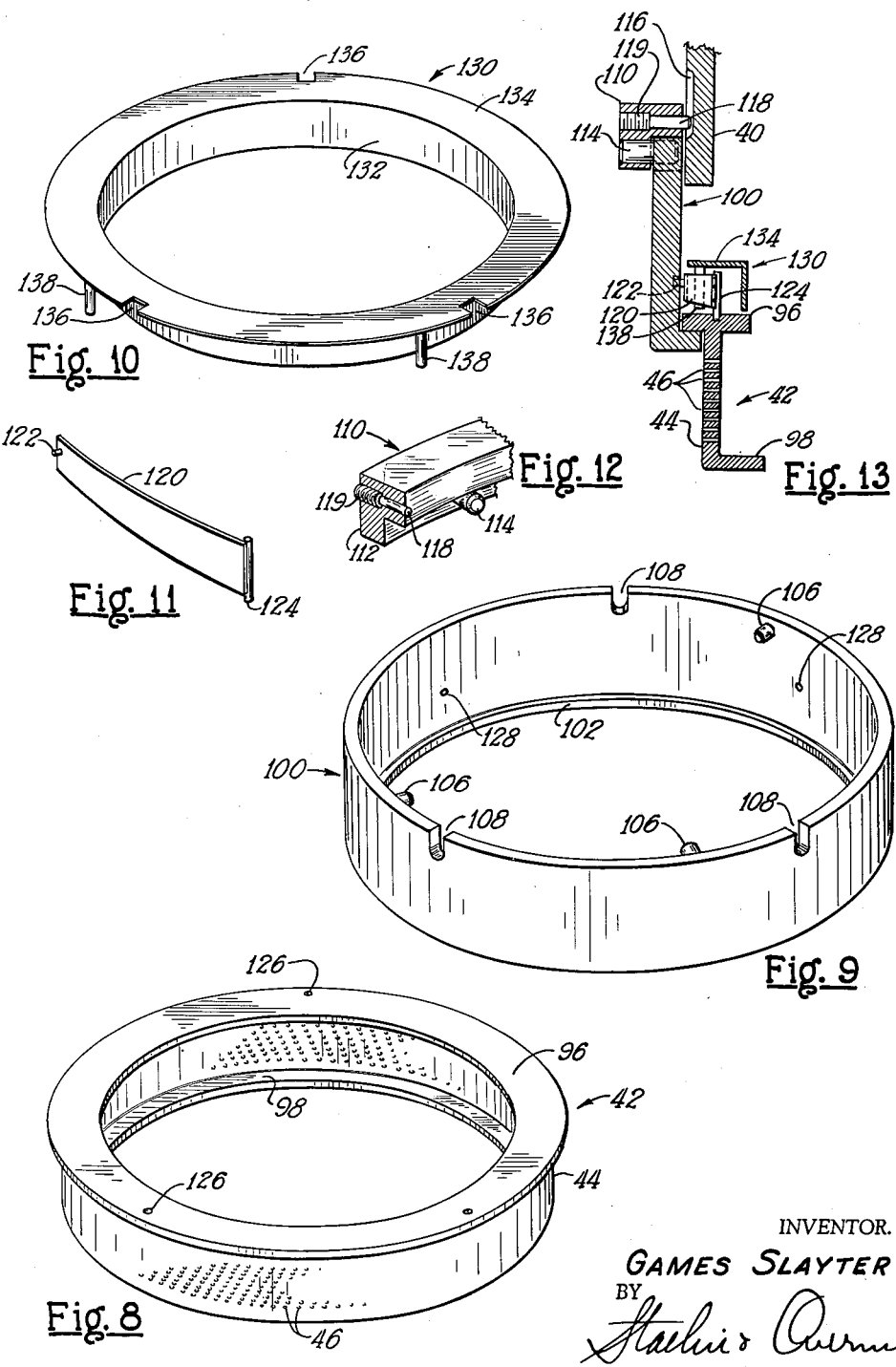

United States Patent Office 3,030,659
Patented Apr. 24, 1962

3,030,659
APPARATUS FOR PRODUCING FIBERS
Games Slayter, Newark, Ohio, assignor to Owens-Corning Fiberglas Corporation, a corporation of Delaware
Filed Dec. 29, 1958, Ser. No. 783,460
9 Claims. (Cl. 18—2.5)

This invention relates to apparatus for producing fibers from heat-softenable mineral materials such as glass, and more particularly to a structural arrangement wherein heat-softened mineral material is subjected to centrifugal forces to form or subdivide and attenuate the material into fibers or filaments, or for forming primary filaments or discrete linear bodies by centrifugal forces and further attenuating the filaments or bodies by additional means.

Mineral fibers, such as glass fibers, have been produced through the utilization of centrifugal forces for delivering discrete bodies of heat-softened mineral material into a circularly shaped gaseous blast, such as a steam or air blast of high velocity, or a blast of intensely hot burned gases of combustion for attenuating the centrifuged bodies to fine fibers.

Apparatus for carrying out the above-mentioned method of forming fibers embodies a rotor having a perforated peripheral band or wall through which the glass or mineral material is projected by centrifugal forces, such rotor being supported by a shaft or sleeve of substantially lesser diameter than that of the rotor, the shaft or sleeve being supported upon antifriction mechanical bearings and the shaft and rotor driven by an electrically energizable motor.

Apparatus of this character is subjected to the high temperatures of the heat-softened or molten glass of 2000° F. or more and in order to obtain satisfactory operation extraneous cooling devices and mediums have been utilized in order to carry on fiber-forming operations at safe operating temperatures.

The present invention embraces apparatus for forming fibers from heat-softened or flowable mineral material wherein the material at the perforated region of the rotor or spinner is conditioned by heat so that the material is maintained at a proper viscosity to secure most efficient centrifuging of the material and attenuation of the material to filament or fiber form.

An object of the invention resides in the provision of a spinner or rotor construction arranged to be rotated by gas under pressure and supported by the gas such as compressed air, whereby the rotor may be operated or driven without appreciable friction at variable speeds by controlling the pressure and rate of delivery of the gas.

Another object of the invention embraces the provision of a rotor or spinner structure for centrifuging heat-softened mineral material wherein a fluid motivated turbine means drives the rotor, the fluid additionally functioning as a heat absorbing medium for controlling the temperature of the rotor structure.

Another object of the invention is the provision of means for conveying heat-softened glass or other mineral material to an interior peripheral region of a rotatable spinner through the use of a fluid under pressure whereby heat losses are greatly reduced and the glass delivered into the spinner without adhering to the conveying means.

Another object of the invention resides in the provision of a means for heating the glass or other material in the spinner or rotor whereby heat is distributed radially throughout the peripheral area of the spinner wall exept at the region of delivery of glass whereby the glass at the spinner wall is maintained at a viscosity best suited for projecting the glass through orifices in the spinner wall to form fibers or filaments.

Another object of the invention is the provision of an internal combustion burner disposed within a rotor where-in the burner is formed with a substantially annular combustion chamber arranged substantially concentrically with a perforated peripheral wall of the rotor adapted to contain heat-softened fiber-forming material, the combustion chamber being adapted to burn combustible mixture and formed with peripheral orifice means for directing hot gases in direct contact with the material in the rotor.

Still another object of the invention is the provision of fiber-forming apparatus of a character which may be positioned close to the supply of heat-softened fiber-forming material to further reduce heat losses.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 3 is a transverse sectional view of the fiber-forming apparatus illustrated in FIGURE 1;

FIGURE 4 is an enlarged detail sectional view of a portion of the rotor and the rotor housing;

FIGURE 5 is a horizontal sectional view taken substantially on the line 5—5 of FIGURE 3;

FIGURE 6 is an isometric view of a component of the rotor construction;

FIGURE 7 is a fragmentary isometric view of a portion of the rotor housing construction;

FIGURE 8 is an isometric view of a spinner section of the rotor construction;

FIGURE 9 is an isometric view of a component connecting the spinner section with a driving section of the rotor construction;

FIGURE 10 is an isometric view of a member forming a component of the rotor construction;

FIGURE 11 is an isometric view of one of the driving connections for the spinner section;

FIGURE 12 is a fragmentary isometric view of a portion of a locking ring forming a component of the rotor construction;

FIGURE 13 is a fragmentary vertical sectional view illustrating the arrangement of components of the rotor construction in assembled relation;

The apparatus illustrated is particularly adaptable for forming heat-softened material such as glass into fine fibers, but it is to be understood that we contemplate the use of apparatus for forming fibers or discrete linear bodies from other heat-softenable mineral materials, such as slag or fusible rock or wherever the invention may be found to have utility.

The apparatus of the invention for forming fibers or linear discrete bodies is constructed in the form of a unit which may be utilized by itself or in conjunction with other units of the same character whereby fibers or linear bodies from several units may be concomitantly collected to form a fibrous pack or mass of substantial dimensions. If a mass or mat of substantial width is desired the units may be used in a transversely disposed arrangement and if a comparatively thick mass or mat of fibers or bodies is desired, two or more units may be disposed adjacent one another lengthwise of a continuously moving conveyor or collector upon which the fibers or bodies may be deposited as a continuous pack or mat.

Figure 1:
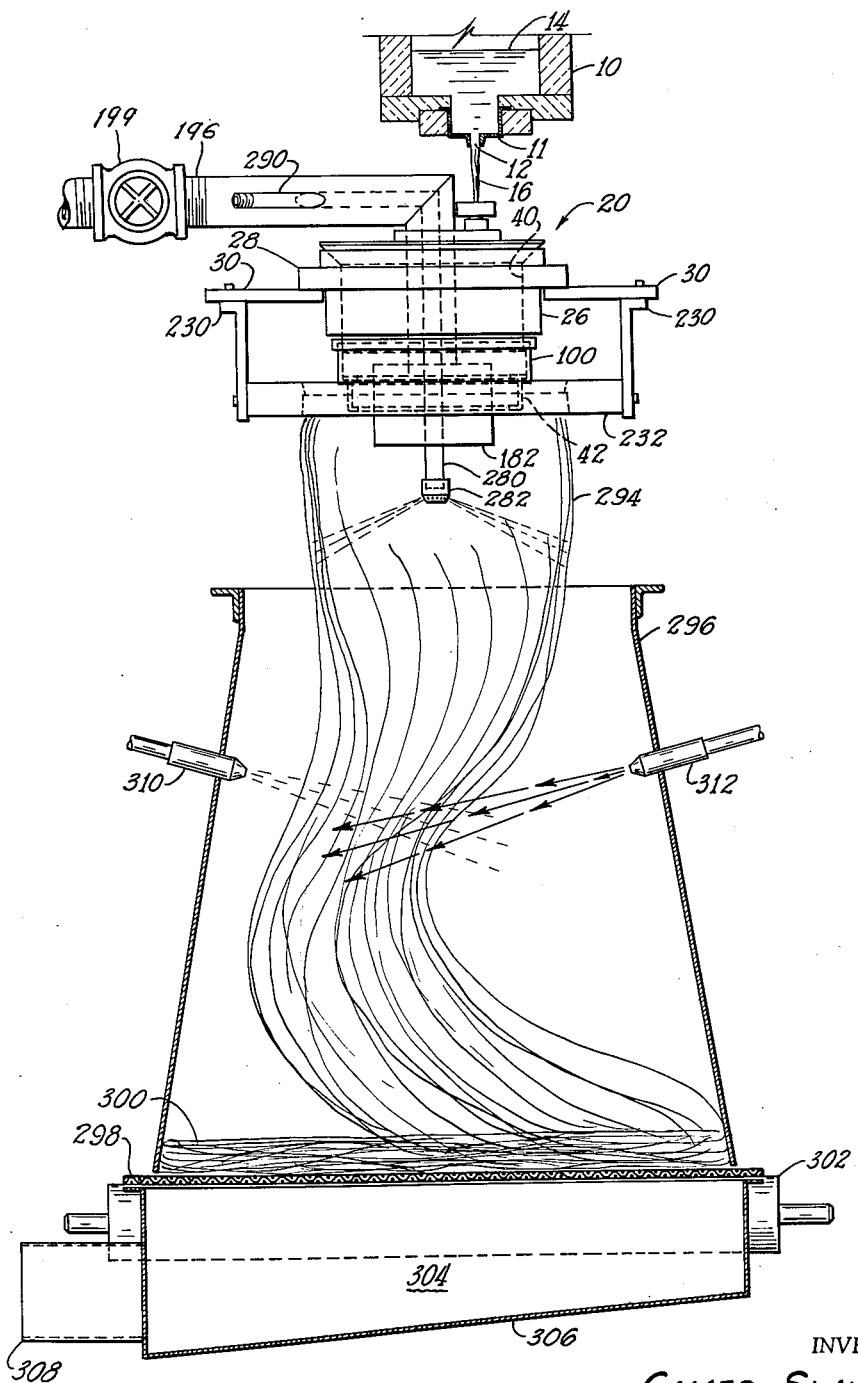
FIGURE 1 is a semidiagrammatic elevational view showing a form of fiber-forming apparatus of the invention associated with means for collecting the formed fibers into a pack or mat.

The arrangement illustrated in FIGURE 1 is inclusive of a forehearth 10 connected with a suitable melting furnace or melting tank (not shown) in which glass batch or other heat-softenable attenuable material may be reduced to a molten or flowable condition by the application of heat in a conventional manner.

The forehearth 10 is provided with a feeder 11 having an orifice 12 through which molten glass 14 or other heat-softened material in the forehearth flows or is discharged as a stream 16. The fiber-forming unit of the invention is especially adaptable for economical high production yield of fine fibers and the glass stream 16 delivered to the fiber-forming apparatus is therefore of substantial size. This is an important factor in that heat losses are reduced by utilizing a glass stream of substantial size and which flows through a minimum distance from the feeder to the spinner section or component of the apparatus.

Figure 2:
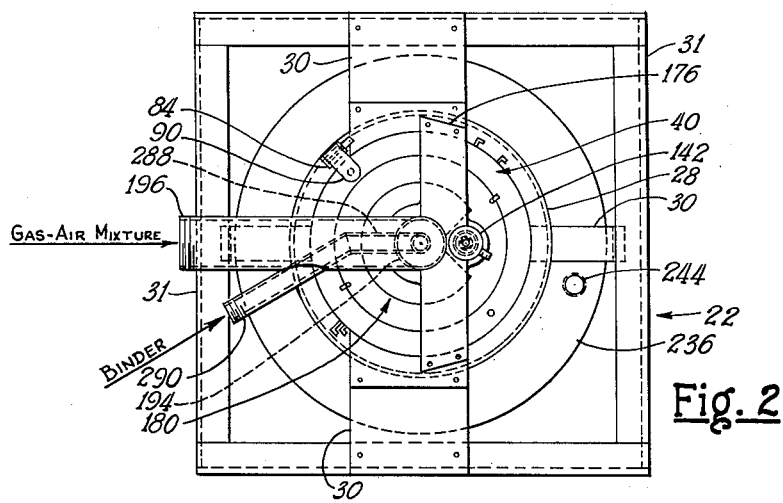
FIGURE 2 is a plan view of the fiber-forming apparatus illustrated in FIGURE 1.

The fiber-forming unit 20 shown in FIGURE 1 includes a frame structure 22 shown in FIGURE 2 which may be supported in any suitable manner. The apparatus includes a hollow circular cylindrically shaped housing or member 26 which fits within an annular member or ring 28, the ring being supported by laterally extending frame members 30 which are supported by structural members 31. The ring 28 is preferably secured to the frame members 30 by means of bolts 32 shown in FIGURE 3. The housing 26 is formed at its upper exterior region with a flange portion 34 forming a ledge which engages the upper surface of the ring 28 and provides a support for the housing 26.

Disposed within the housing member 26 is an annular sleeve 36 which is snugly fitted within the housing 26 and becomes a part of the housing. The sleeve 36 is preferably formed of brass, bronze or the like material which is not readily subject to oxidation and deterioration. The apparatus includes a rotor construction, which, in the embodiment illustrated, includes a hollow sleeve-like section 40 of circular cylindrical shape and a spinner section 42 disposed beneath and connected with the sleeve section 40.

One of the features of the present invention resides in the provision of a rotor section 40 which may be of substantial diameter. It is found that the rotor may be eight inches or more in diameter, a factor which facilitates the utilization of an efficient and effective heat applying means for fiber-forming material contained within the spinner section and accommodates a means for guiding or directing the glass or material of the stream 16 into the spinner section in a manner to obtain improved distribution of the glass or material therein.

In the embodiment illustrated the spinner section 42 is preferably formed as an independent component which is removably secured to and driven by the sleeve section 40 of the rotor by means hereinafter described. The spinner section 42 is of hollow configuration provided with a circular peripheral wall 44 formed with a plurality of rows of comparatively small openings or orifices 46 through which flowable glass or other material on the interior of the peripheral wall 44 is projected forming discrete linear bodies, primary filaments or fibers under the influence of centrifugal forces of rotation of the rotor.

In the illustrated embodiment of the invention, fluid under pressure, such as compressed air, is utilized as an anti-friction means for supporting the rotor construction during rotation and for rotating the rotor construction. The rotor construction is an impulse turbine and the rotor housing 26 is formed with nozzles or outlets through which fluid under pressure is projected into buckets or recesses in the rotor. The upper end region of the sleeve section 40 is formed with an outwardly extending peripheral portion 48 formed with a frusto-conically shaped surface 50 as shown in FIGURES 3 and 6.

The surface 50 is formed with a large number of circumferentially spaced semicircular recesses or buckets 52 which are particularly illustrated in FIGURE 6. The upper end regions of the rotor housing 26 and the interior lining 36 are shaped to form a frusto-conically shaped surface 54. The frusto-conically shaped surface 50 of the rotor sleeve 40 and the frusto-conically shaped surface 54 formed on the housing 26 are in convergingly disposed relation as particularly shown in FIGURES 3 and 4.

While the angle of convergence illustrated at A in FIGURE 4 may be varied within limits, it has been found that a convergence of about two degrees between the surface 50 and the surface 54 has been found to function quite efficiently. As particularly shown in FIGURE 4, the circular line of contact indicated at 60 between the rotor housing 26 and the flange portion 48 of the sleeve section 40 is above the regions of the turbine buckets or recesses 52.

An annular clearance or running space 62 is provided between the exterior cylindrical surface of the sleeve section 40 and the inner surface of the liner 36 which may be comparatively substantial for the reason that the rotor, being supported by air or other fluid under pressure is self-centering as the rotor sleeve 40 is maintained in a central position by the film of air or gas under pressure in the annular clearance or running space 62.

As particularly shown in FIGURE 3, the inner region of the housing 26 adjacent the liner 36 is formed with circumferential grooves or chambers 64, 66 and 68 which are in vertically spaced relation. The chambers 64, 66 and 68 are supplied with gas or fluid under pressure from a supply through tubes or pipes 70, 72 and 74 respectively which extend into openings formed in the wall of the housing or stator section 26 in the manner shown in FIGURE 3.

The liner 36 is formed with three vertically spaced rows of small openings designated respectively 76, 78 and 80 in communication respectively with the annular chambers 64, 66 and 68 for conducting gas or fluid under pressure into the running or clearance space 62 whereby the rotor sleeve section 40 is laterally supported or centered upon a film of gas. It has been found that compressed air provides an effective medium for this purpose but steam or other gases under pressure may be utilized for the purpose. The openings or passages 76, 78 and 80 are of comparatively small size in order to minimize the amount of compressed gas supplied to the annular space 62 for purposes of economy.

As particularly shown in FIGURES 3, 4 and 7, the upper region of the sleeve section 40 of the rotor construction is provided with at least one circumferential row of gas passages or nozzles 82 in communication with the annular chamber 64. The passages 82 are arranged in a circular path substantially concentric with the axis of the rotation of the rotor construction and each passage is arranged at an angle of about 45° with respect to the axis of the rotor as shown in FIGURE 7 so that the compressed air issuing from each of the outlets of the passages 82 adjacent the turbine recesses or buckets 52 forming a high velocity jet angularly directed toward the recesses or buckets 52 provide a driving force for rotating the rotor construction.

The air or gas under pressure delivered through the passages 82, in addition to driving the rotor construction, slightly elevates the rotor construction to effect a physical separation of the frusto-conically shaped surfaces 50 and 54 whereby the spent air is projected outwardly at the region 60 between the rotor and the stator or housing 26 whereby the rotor construction during rotation is solely supported upon a layer or film of air or other fluid delivered through the passages 82.

Some of the air in the clearance or running space 62 flows upwardly and escapes between the frusto-conically shaped surfaces of the stator and rotor. Some of the air or gas under pressure in the clearance or running space 62 escapes downwardly and into the atmosphere at the lower edge of the liner 36. It is known that rotation of a rotor by fluid under pressure in the manner above described is effective to support the rotor upon a film of gas and that the rotor moves upwardly only a slight distance due to the differential forces or Bernoulli forces developed by the air escaping between the rotor and stator.

In operation, the separation of the rotor from the stator at the region indicated at 60 in FIGURE 4 is only a few thousandths of an inch and the gas or compressed air continuously escapes through the region of separation of the rotor and stator at a rate as restricted by the Bernoulli forces acting in a downward direction upon the rotor. As shown in FIGURES 2 and 3, a fitting 84 is secured to the annular member 28 by a bolt 86.

Pivoted upon a pin or stub shaft 88 carried by the fitting 84 is a member 90 providing a locking means for the rotor sleeve section 40, the member 90 being provided with a keeper 92 which is adapted for selective engagement in any of several openings or recesses 94 formed in the rotor. FIGURE 3 illustrates the member 90 in locking position with the keeper 92 engaging in one of the openings 94. Through this means the rotor may be locked for purposes of inspection or repair. The member 90 is adapted to be swung in a counterclockwise direction about the pivot shaft 88 to disengage the keeper 92 from the rotor during operation of the apparatus.

FIGURE 3 illustrates the spinner section 42 of the rotor in operative position, the spinner section being removably secured to the rotor sleeve section 40. The spinner section 42 is shown in FIGURE 8 and the components for securing the spinner section to the sleeve section 40 are illustrated in FIGURES 3 and 9 through 13. As particularly shown in FIGURE 8, the spinner section is provided with an annular flange 96 at the upper region of the peripheral wall 44, the lower portion of the spinner section being provided with an inwardly extending annular flange 98.

The spinner section 42 is suspended from the rotor sleeve section 40 by means of a sleeve or member 100 of circular shape shown in FIGURE 9. The interior diameter of the sleeve 100 is adapted to accommodate the flange 96 on the spinner section, the lower end of the sleeve 100 being formed with an inwardly extending flange 102 which engages the lower surface of the flange 96 to support or suspend the spinner section 42.

With particular reference to FIGURE 6, it will be noted that the sleeve 40 is provided at its lower region with bayonet slots or configurations 104.

In FIGURE 9 it will be seen that the sleeve 100 is formed with inwardly extending projections or pins 106 which, when the member 100 is assembled with the rotor sleeve 40, enter and cooperate with the bayonet slots 104 to secure member 100 and rotor sleeve 40 in driving relation. As shown in FIGURE 9, the upper edge of the annular band or member 100 is provided with open slots 108. A keeper ring or annular member 110 of L-shape cross-section as shown in FIGURE 12, has a depending circular portion 112 provided with circumferentially spaced inwardly extending pins 114 which, when the member 100 and 110 are in assembled relation, engage in the slots 108 in the member 100.

As shown in FIGURE 6, the lower exterior region of the sleeve section 40 of the rotor construction is provided with circumferentially spaced, axially extending slots 116. As shown in FIGURES 12 and 13, the keeper ring 110 is provided with circumferentially spaced radial bores to accommodate tenon portions 118 of threaded members or screws 119 which are threaded into threaded bores at the openings accommodating the tenons 118.

As shown in FIGURE 13, the keeper ring 110 is adapted to be supported by the rotor sleeve 40 through engagement of the tenon members 118 in the vertical or axially disposed slots 116 in the rotor section 40. The slots 116 are elongated in a vertical direction to facilitate vertical relative sliding movement of the ring 110 with respect to the sleeve 40 to disengage the pins 114 from the slots 108 in the member 100.

During the use of the apparatus of the invention, the perforated spinner section 42, which receives the molten glass or other heat-softened material, is at a very high temperature of 2000° F. or more, much higher than the temperature of the band or annular member 100 and the sleeve section 40. It is therefore essential to provide a substantial amount of clearance between the peripheral edge of the flange 96 and the interior diameter of the band 100 in order to accommodate the expansion and contraction of the spinner section 42 due to extreme temperature differentials between the spinner section and its supporting components and the rotor sleeve 40.

The arrangement is inclusive of means for establishing a driving connection between the spinner section 42 and the band 100 which will not interfere with the relatively high expansion and contraction of the spinner section 42. In the embodiment of the invention illustrated, three driving members 120 are utilized for this purpose, one of which is illustrated in FIGURE 11. Each driving member 120 is formed of sheet metal, one end of which is provided with a laterally or transversely extending pin 122, the other end of the member 120 being provided with a pin 124 disposed substantially at right angles to the axis of the pin 122.

With particular reference to FIGURE 8 it will be seen that the flange 96 is provided with three openings 126 and the projecting portion of pin 124 on each of the driving members 120 is adapted to extend into an opening 126 in the spinner section.

As shown in FIGURE 9, the interior region of the band or circular member 100 is provided with three radial openings or bores 128 each of which is adapted to accommodate a transversely extending pin 122 on a driving member 120. The assembly of the driving members 120 with the spinner section 42 and the band 100 is illustrated in FIGURES 3 and 13.

Means 130 is provided for retaining the driving members 120 in proper position, such means being illustrated in FIGURES 10 and 13. The retaining means 130 is of annular shape having a vertical wall portion 132 and a laterally extending annular flange portion 134. The diameter of the flange portion 134 is less than the interior diameter of the band 100 whereby the member 130 is loosely received within the band 100. The flange 134 is provided with clearance slots 136 for the pins 106 to facilitate telescoping the member 130 within the member 100.

The flange portion 134 of member 100 is provided with depending pins 138 which, when member 130 is assembled in the position shown in FIGURE 13, engage and rest upon the upper surface of the flange 96 of the spinner section. The pins 138 are circumferentially spaced as shown in FIGURE 5 in a position to engage the innermost surfaces of the driving members 120 and serve to hold the driving members in position and prevent dislodgement or disengagement of the pins 122 from the openings 128 in the band 100.

Through this arrangement of supporting or suspending the spinner section 42 of the rotor construction from the sleeve section 40, the spinner section is permitted unrestricted movement to accommodate expansion and contraction while a positive drive is established between the member 100 and the spinner section 42 through the driving connections or members 120. The method of assembling the spinner section 42 with the sleeve section 40 is as follows: The spinner section 42 is inserted in the band or annular member 100 with the flange 96 at the upper edge region of the spinner section engaging the inwardly extending flange 102 of the band 100.

After the spinner section 42 is in its nested relation in the band 100, the driving elements 120 are assembled with the spinner section 42 and the band 100 through insertion of the pins 124 in the openings 126 in the flange 96 of the spinner section and the insertion of the pins 122 in the openings 128 of the band 100. The annular member 130 is then inserted within the band 100 to contact the ends of pins 138 with the flange 96 of the spinner section to position the member 130 therewith, the pins 138 engaging the mid-regions or central regions of the driving members 120 as shown in FIGURE 5 to assure that the laterally extending pins 122 are maintained in the openings 128 in the band 100.

The band 100 is then telescoped in an upward direction with the lower end region of the sleeve section 40 with the keeper ring 110 held in an elevated position as permitted by the slots 116.

With the keeper ring 110 in its elevated position, the band 100 is moved upwardly to engage the inwardly extending pins 106 on band 100 in the bayonet slots 104 in the lower edge region of the rotor sleeve section 40, the band 100 being then turned or rotated a short distance to seat the pins 106 in the base regions of the bayonet slots 104.

With the band 100 in this position, the keeper ring 100 is moved downwardly, the pins 114, extending inwardly from the keeper ring 110, engaging or nesting in the open-ended slots 108 in the band 100 to prevent relative rotation of the band 100 with respect to the sleeve section 40. Through this locking arrangement, the pins 106 are held in the bayonet slots 104 to prevent disengagement of the rotor section 40 from the band 100.

The spinner section and associated components may be readily disengaged from the rotor sleeve section 40 by elevating the keeper ring 110 to disengage the pins 114 from the slots 108. The band 100 may then be slightly rotated relative to the sleeve section 40 to disengage the pins 106 from the bayonet slots 104 whereby the spinner section assembly may be moved downwardly away from the sleeve section 40.

Means is provided for guiding, conveying or directing the molten glass of the stream 16 or other heat-softened material into the interior surface region of the perforated peripheral wall 44 of the spinner section. One form of arrangement of glass guiding and conveying means is illustrated in FIGURES 3 and 5. Extending vertically into the sleeve section 40 of the rotor and at one side of the central axis thereof is a tube 140, the upper end of the tube adapted to receive the glass stream 16 being provided with a blower construction 142.

As shown in FIGURE 3, the lower end region of the vertically disposed tube 140 is provided with an elbow portion 144, the exit of which is disposed so as to direct the glass of the stream laterally into contact with the inner surface of the perforated wall 44 of the spinner section 42. The exit region of the elbow portion 144 is disposed in close proximity to the wall 44 in order to minimize the distance traversed by the glass from the exit of the elbow portion to the wall 44 and thus minimize heat loss from the glass or other material.

The glass feeding blower 142 includes a substantially circular housing 146 and a cover plate 148. The housing 146 is formed with an annular chamber 150 adapted to receive fluid under pressure such as compressed air from a supply through a tube 152. The cover plate 148 is formed with an opening 154 to admit glass through the blower into the tube 140. The blower housing 146 is formed with a circular opening or passage 156 formed in a raised circular portion 158 formed on the housing 146. The cover portion 148 is formed with a depending circular skirt 160 spaced from the upper end region of the passage 156 whereby the fluid under pressure in the chamber 150 is discharged downwardly through the circular passage 156 and surrounds the glass of the stream 16.

The downwardly directed blast of compressed air or the like in the interior of the tube 140 accelerates the flow of the glass downwardly and stabilizes the stream to maintain it centrally disposed within the tube 140. The flow of air downwardly through the tube 140 serves to assist in cooling the tube 140. The tube 140 is surrounded by a second tube 164 spaced therefrom to form an annular chamber or cooling jacket 166. The tube 164 is formed or provided with an extension 168 adjacent the elbow portion 144 providing a continuation 170 of the chamber 166. The upper end of the chamber 166 is provided with an inlet tube 172 and the chamber 170 at the elbow portion is provided with an upwardly extending tube 174 providing an outlet for the chambers 166 and 170. Water or other cooling or heat absorbing fluid is circulated through the chambers 166 and 170 to maintain the walls of the tube 140 and the elbow portion 144 at reduced temperatures in order to minimize any tendency of the hot glass to stick or adhere to the interior of the walls of the tube. The glass guiding and conveying means provided by the tube 140 and associated components is supported upon a plate 176.

Figures 14, 15, 16:
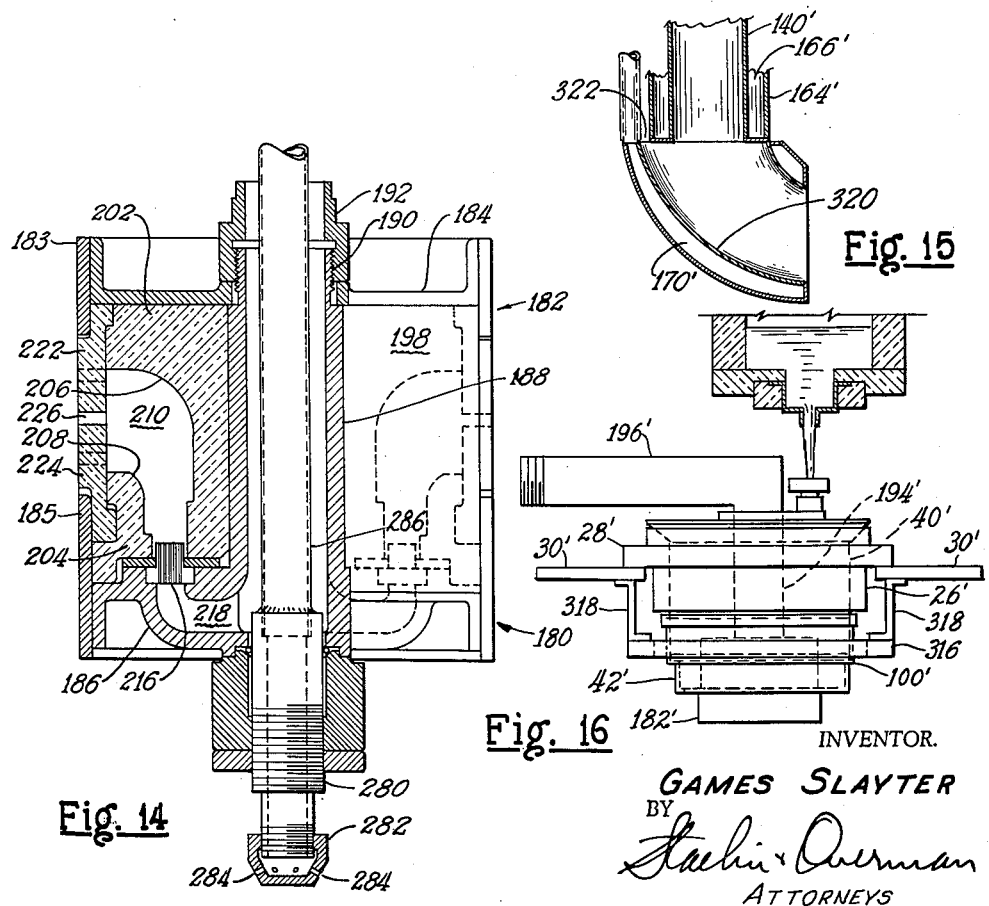
FIGURE 14 is a sectional view through a heat applying means forming a part of the invention.
FIGURE 15 is a fragmentary detail sectional view illustrating a modified form of glass or material conveying means.
FIGURE 16 is an elevational view showing a modified form of the fiber-forming apparatus.

The softened glass at the interior peripheral surface of the spinner section 42 is maintained in flowable condition at a proper temperature by a novel heating or heat applying means particularly illustrated in FIGURES 3, 5 and 14. In the embodiment illustrated, the heat applied to the glass in the spinner section is provided by intensely hot gases of combustion. Disposed interiorly of the spinner section 42 and in substantially concentric relation with the peripheral wall of the spinner is an internal combustion burner construction 180.

The burner construction is inclusive of a substantially circular housing 182 formed by an upper plate 184, a lower plate-like portion 186, and circular members 183 and 185 shown in FIGURE 14. The portion 186 is formed with a hollow or tubular section 188 concentric with the vertical axis of the burner. The upper end region of the tubular portion 188 is threaded as at 190 to receive a fitting or coupling 192. Welded or otherwise secured to the fitting 192 is an upwardly extending pipe or tube 194 which, at a region above the rotor sleeve section 140, is joined with a horizontally disposed tube or pipe 196.

The vertical tube 194 is welded or otherwise secured to the supporting plate 176 providing a support for the burner. The pipe 196 is adapted to be connected with a supply mixture of fuel gas and air or other combustible mixture which is conveyed to the burner through the connected pipes 188, 194 and 196. It will be noted from FIGURE 5 that the ends of the circular housing 182 terminate at either side of the glass conveying means and the ends of the housing 182 are joined with the tubular portion 188 by means of walls 198 and 200. The glass conveying tube and its associated components extend downwardly in the gap or space provided between the walls 198 and 200.

Disposed within the circularly shaped space defined by the burner housing 182 and the walls 198 and 200 is a member 202 of refractory. Disposed within the lower region of the housing 182 is a second member 204 of generally circular shape fashioned of refractory. A surface 206 of the refractory 202 and the surface 208 of the refractory 204 define a circularly shaped confined zone or combustion chamber 210 which is concentric with the housing 182, the ends of the circularly shaped combustion chamber being defined by refractory end walls 212 and 214 disposed adjacent the walls 198 and 200 as shown in FIGURE 5.

The lower regions of the interior walls defining the combustion chamber are spaced concentrically to receive and accommodate a generally circular means 216, which may be formed of a series of radially spaced, concentric ribbons or a circular member provided with a comparatively large number of small passages to facilitate flow of combustible mixture from the pipe or tubular portion 188 into the combustion chamber 210.

The ribbon-like structure 216 provides a plurality of small passages for the admission of the mixture into the combustion chamber forming a fire screen to prevent pre-ignition of the mixture in the supply tube 188.

As particularly shown in FIGURE 14, the member 186 is formed with a disk-like passage or manifold 218 for supplying combustible mixture to the passages in the fire screen 216 whereby the mixture flows into the circular combustion chamber 210 throughout a circular region defined by the end walls 212 and 214. The circular members 183 and 185 are spaced vertically to accommodate circularly shaped members 222 and 224 which are shaped to define an orifice construction for the combustion chamber 210.

As particularly shown in FIGURE 3, the members 222 and 224 are formed with undulated surfaces spaced to form a sinusoidal-like orifice 226. The amplitude or vertical limits of the undulations forming the orifice 226 are of a dimension to span the interior region of the peripheral wall 44 of the spinner section between the flanges 96 and 98 as shown in FIGURE 3.

The combustible mixture is conveyed by the pipe 188 through the manifold 218 and the passages in the screen-like member 216 into the circularly-shaped combustion chamber 210. The mixture is ignited and is substantially completely burned within the combustion chamber 210 and the intensely hot burned gases projected through the sinusoidal-shaped orifice 226.

Through this arrangement, the heat of the intensely hot burned gases is projected directly against the film or layer of molten glass contained within the peripheral wall of the spinner section 42 through substantially the entire area thereof so as to maintain the glass in flowable condition whereby centrifugal forces of rotation of the rotor project the glass through the openings 46 in the form of elongated discrete bodies or primary filaments 47.

The amount of heat supplied to the glass on the interior of the spinner section may be controlled by regulating the rate of flow of combustible mixture into the combustion chamber 210 by valve means 199 connected between the mixture supply pipe 196 and the supply of combustible mixture. The temperature and hence viscosity of the glass within the spinner section 42 may be controlled or regulated for most efficient centrifuging of the material.

The arrangement of the present invention includes the provision of means for engaging a high energy, high velocity gaseous blast with the primary filaments or discrete bodies 47 projected from the rotating spinner section 42 for drawing out or attenuating the primary filaments or discrete bodies to fine fibers. As shown in FIGURE 3, brackets 230 are secured to and depend from the plate sections 30 of the supporting frame arrangement. Secured to the lower end regions of the brackets 230 is a substantially annular housing 232 formed with an annular shaped chamber or manifold 234.

The housing 232 is provided with an annularly shaped cover plate 236 formed with an interior circular lip portion 238 which is spaced from an interior circular surface 240 formed on the housing 232 providing a restricted annular orifice or opening 242. The manifold or annular chamber 234 is supplied with a gas under pressure through a supply pipe 244 which is threaded into an opening in the cover member 236. The gas or fluid such as steam under pressure or compressed air delivered into the manifold 234 is projected through the annular orifice 242 as a downwardly directed high velocity gaseous blast. The downwardly moving gaseous blast engages the outwardly directed primary filaments or discrete bodies and the forces of the blast draw out or attenuate the material of the bodies or primary filaments to fine fibers. By reason of the annular shape of the blast, the fibers are oriented into a hollow tubular or beam formation as shown in FIGURE 1.

It should be noted that the direction of the travel of the blast is normal to the outward direction of movement of the discrete bodies 47 so that the material of the bodies is abruptly changed in a downward direction under the influence of the downwardly moving gases of the blast. Means is provided for controlling or restricting the induced air flow established by the movement of the gases of the blast. As shown in FIGURE 3, a circular sleeve 248 is secured to and depends from the rotor housing 34, the lower region of the sleeve 248 being secured to a horizontally extending annular member 250.

The horizontal member 250 extends outwardly above the upper surface of the cover member 236 of the blower housing 232 and provides a restricted space 252 through which blast-induced air is admitted to the gases of the blast. The housing 232 of the blower construction is secured to the brackets 230 by bolts 254 extending through vertically disposed slots 256 to facilitate adjustment in a vertical direction of the blower construction to regulate the size of the space 252.

The arrangement of the invention includes means for directing cooling air adjacent the upper exterior peripheral region of the burner housing 182 and causing flow of air through the region at which heat is applied to the glass on the interior of the spinner wall 44. Disposed above the member 130 is a stationary cylindrically shaped sleeve 260 which is spaced from the inner wall of the rotating sleeve section 40. Spaced above the horizontal flange portion 134 of the member 130 is an inwardly extending plate-like portion 262 secured to the cylindrical sleeve 260 as shown in FIGURE 3 which engages and is supported by an upper surface of the burner housing 182. Disposed beneath the plate 262 is a tube 264 of circular shape which is provided with upwardly extending pipes or tubes 266 connected with a supply of compressed air or other gas suitable for cooling purposes. The wall of the inner region of the circular tube 264 is provided with a plurality of circumferentially-spaced, comparatively small orifices or outlets 270 disposed to direct jets or streams of compressed air downwardly and inwardly toward the burner housing 182 for maintaining the upper region of the housing at a safe operating temperature.

By reason of the horizontal plate 262 and the baffle provided by the annular member 130, the air from the orifices 270 flows downwardly through an annular space 272 between the depending flange 132 of the member 130 and the exterior wall surface of the housing 182 thence through the annular region between the exterior surfaces of the orifice members 222 and 224 and the softened glass within the interior of the spinner section whereby the downwardly moving air is heated from the hot gases of combustion projected through the sinusoidal-shaped orifice means 226.

The downwardly moving heated air performs an additional function. By reason of the high velocity downwardly directed attenuating blast from the blower chamber 234, there is a normal tendency for the beam of fibers to "neck in" toward the central region beneath the burner 180. The air flowing through the space within the spinner section between the burner and the wall 44 moves outwardly in the direction of the arrows illustrated in FIGURE 3 and upwardly toward the outwardly moving filaments or bodies 47.

This air also tends to equalize the pressure adjacent the lower exterior region of the burner thereby reducing the tendency for the fibers to "neck in" toward the central axis and avoiding the deposition of fibers upon the downwardly extending portion of the burner 180.

Means is provided for delivering fiber coating material or binder onto the fibers from the interior of the beam or hollow column of fibers. Secured to the member 286 is a fitting 280 of tubular construction provided at its lower extremity with a nozzle portion 282 formed with outwardly directed passages 284 through which binder or fiber coating material may be projected onto the fibers as illustrated in FIGURE 1. The binder or fiber coating material is delivered to the fitting 280 through a tube 286 centrally disposed within the tubular portion 188 of the member 186.

As shown in FIGURE 2, the upper end of the tube 286 is connected with a horizontally disposed tube 288 formed with an angularly arranged extension 290 which projects through an opening in the wall of the mixture supply tube 196 and is welded to the wall of the tube 196 to provide a sealed joint. The tube or extension 290 is connected with a supply of binder, lubricant or other fiber coating material.

The fiber coating material, lubricant or binder is delivered from the nozzle construction 282 under sufficient pressure providing a spray or mist of the material directed onto the fibers as they move downwardly away from the blast. As shown in FIGURE 1 the fibers of the hollow beam 294 move downwardly away from the fiber-forming apparatus into a hood or chamber 296 by gravity and under the influence of the downwardly directed gases of the attenuating blast.

Disposed at the base of the hood 296 is a movable conveyor 298 preferably of foraminous construction upon which the fibers of the beam are collected in a mass or pack formation 300. The conveyor 298 is mounted upon suitable rollers, one of which is shown at 302 and which is driven by means (not shown) to continuously advance the conveyor 298. A chamber 304 provided by a receptacle 306 is disposed below the upper flight of the conveyor 298 and in registration with the hood 296, the chamber 304 being connected by means of a tube 308 with a suction blower or source of subatmospheric pressure.

By establishing subatmospheric pressure or suction in the chamber 304, the fibers are collected in a more compact mass and the spent gases of the blast carried away through the chamber 304. Means may be provided for oscillating or reciprocating the beam of fibers transversely of the direction of movement of the conveyor 298 for lapping the fibers in transverse directions to improve the fiber orientation in the mat and hence the strength characteristics of a mat which may be formed from the collected fibers.

As shown in FIGURE 1 nozzles, 310 and 312 are respectively disposed in the side walls of the hood 296 and the nozzles are arranged in conjunction with valve mechanism 199 for directing fluid under pressure such as compressed air alternately from opposite sides to cause the beam of fibers to oscillate as schematically shown to cause a lapping of layers of fibers as indicated at 300.

The operation of the apparatus is as follows: A combustible mixture is delivered into the combustion chamber 210 of the burner and is ignited and burning continued without other operations being initiated until the peripheral wall 44 of the spinner section 42 is brought up to a temperature about the softening point of glass so that the glass or other material when projected into contact with the spinner wall will remain in a flowable state or condition.

After the spinner wall is brought to the proper temperature, compressed air or other motive fluid is admitted through the tubes 70, 72 and 74 into the chambers 64, 66 and 68 whereby the compressed air flows through the angularly disposed passages 82 providing pressure jets effective against the turbine recesses 52 in the angular portion 54 of the rotor sleeve 40 and through the passages 76, 78 and 80 in the liner 36 of the rotor sleeve 40 to effect a centering of the rotor sleeve 40 within the liner 36.

The discharge of compressed air or other fluid under pressure through the passages 82 causes the sleeve 40 to rotate, the pressure elevating the sleeve slightly. This permits the escape of air through the circular region indicated at 60 in FIGURES 3 and 4 whereby the rotor construction is supported entirely upon a film of air. Rotation of the rotor is attained by the impingement of the air jets from angular passages 82 into the turbine recesses 52. The spinner section 42, being secured to the sleeve section 40, is rotated with the sleeve.

After the rotor construction acquires a desired speed of about 3000 r.p.m. or more, compressed air is admitted to the blower chamber 150 to established a downwardly moving flow of air through the glass conveying tube 140 and steam or other gas admitted to the manifold 234 to provide the fiber attenuating blast. The glass stream 16 is directed into the entrance of the blower 142 and is conveyed downwardly through the tube 140 under the influence of the air flow through the tube 140, the glass of the stream being projected outwardly through the elbow portion shown in FIGURE 1 into contact with the interior surface of a spinner wall 44 providing a supply of glass in flowable condition at this region.

The heat from the burned gases or products of combustion projected through the sinusoidal-shaped orifice 226 maintains the glass in the spinner section in a flowable state, and under the influence of centrifugal forces of rotation, the glass in the spinner is projected through the openings 46 to form discrete linear bodies or primary filaments 47. Steam under pressure or compressed air in the blower chamber 234 projected through the annular restricted orifice 242 provides a downwardly moving high velocity blast engaging the primary filaments or linear bodies 47.

The high velocity of the blast attenuates the glass of the primaries or bodies into fine fibers or filaments which are oriented in the form of the hollow beam 294 shown in FIGURE 1. Air under pressure is fed into the circularly shaped tube 264 through the inlet pipes 266, the air in the circular pipe being projected through the orifices 270 downwardly through the space 272 between the baffle member 130 and the burner housing 182 and through the region in the spinner section subjected to heat from the gases of combustion delivered through the orifice 226.

The downwardly moving air thus heated moves in the direction of the arrows illustrated in FIGURE 3 upwardly into the region of the outwardly moving discrete bodies or filaments 47 to establish an elevated temperature through which the bodies or filaments are projected as well as to prevent necking in of the fibers toward the central region of the beam of fibers. A binder or coating material may if desired be delivered through the fitting 280 and the nozzle construction 282 onto the fibers in the manner hereinbefore described. If it is desired to cause the beam of fibers to be deposited in overlapping layers, air under pressure or other fluid may be projected alternately from the nozzles 310 and 312 in the manner hereinbefore explained.

FIGURE 15 illustrates a modified form of glass conveying and distributing means. The glass tube 140' is surrounding by a second tube 164' forming a cooling jacket or chamber 166'. The elbow portion at the lower end of tube 140' is formed with an interior curved surface 320, the upper end of which is spaced outwardly from the lower terminus of the tube 164' providing a passage 322 through which air may be admitted to the curved surface 320.

Due to the flow of air through tube 140' from the blower 142 shown in FIGURE 3, the velocity thereof sets up induced air flow into the passage 322 to assist in maintaining the glass or other softened material from direct contact with the interior surface 320 of the elbow portion. The elbow portion is formed wth a jacket or chamber 170' through which water or other temperature controlling fluid is circulated in the same manner as hereinbefore described in connection with the glass conveying means shown in FIGURE 3.

It should be noted that the structural arrangement of the fiber-forming apparatus permits positioning the same close to the feeder 12 so as to minimize heat loss from the stream 16 of glass in its movement from the feeder into the conveying tube 140.

It is found that the rotor construction is self-centering and, as it is supported entirely upon a film of air, friction is reduced to a minimum. This factor contributes to economical high rate of production of fine fibers.

FIGURE 16 illustrates a fiber-forming apparatus substantially similar to that illustrated in FIGURE 1 without the blower means for establishing a gaseous attenuating blast. This arrangement includes a heating means disposed exteriorly of the spinner for maintaining an elevated temperature of the region through which the centrifuged bodies or fibers are projected. The spinner is adapted to be rotated at a speed whereby fine fibers may be formed by centrifugal forces without the assistance of an attenuating blast.

The fiber-forming apparatus shown in FIGURE 16 is inclusive of a housing 26' in which is journally supported the rotor construction embodying a cylindrical sleeve section 40' and a spinner section 42' supported by or suspended from the sleeve section by means of the annular member or ring 100'. A burner construction 182' of stationary character is supported within the spinner, the burner construction being preferably of the internal combustion type which is supplied with combustible mixture through the supply pipes 194' and 196'. The housing 26' is supported through the medium of the ring 28' by frame members 30'. These components are substantially identical with the corresponding components illustrated in FIGURE 1.

Surrounding the annular member or ring 100' and above the paths of centrifuged bodies or fibers moving outwardly from the spinner section 42' is a heating means 316 of generally annular configuration. The heating means 316, in the embodiment illustrated, is supported from the frame members 30' by means of supports or struts 318.

The heating means 316 may be of the radiant type, or a flame heater wherein mixture is burned adjacent the region of the outwardly moving bodies or filaments, or of the internal combustion type adapted to burn a combustible mixture in an annular combustion chamber and the burned gases delivered into the region of the outwardly moving bodies or fibers. An electrical induction type heating means may be employed. The heating means is adapted to maintain a comparatively high temperature in the region traversed by the outwardly moving fibers or bodies, assisting in the formation of fine filaments through high speed rotation of the spinner 42' and without the use of an attenuating blast such as a blast of the character delivered from the blower 232 shown in FIGURE 1.

It is to be understood that the heating means 316 shown in FIGURE 16 may be utilized adjacent the annular member or ring 100 in the arrangement shown in FIGURE 1 for maintaining the region traversed by the fibers or bodies at a desired elevated temperature.

In the form of apparatus shown in FIGURE 16, the rotor construction is rotated by fluid pressure means in the same manner as in the form of the invention illustrated in FIGURES 1 through 4 and may be rotated at a speed whereby the bodies or fibers of heat-softened glass are projected outwardly from the spinner section 42' and through the zone of elevated temperature whereby the fibers or bodies are drawn or attenuated by the centrifugal forces coupled with the drag or friction of the ambient air to form comparatively fine fibers without the use of an attenuating blast such as that described in connection with the form of invention shown in FIGURE 1.

It is apparent that, within the scope of the invention, modifications and different arrangements may be made other than as herein disclosed, and the present disclosure is illustrative merely, the invention comprehending all variations thereof.

I claim:

1. Apparatus for processing heat-softenable mineral material including, in combination, a housing, a hollow rotor disposed in the housing, means for rotating the rotor, said rotor provided with a spinner section having a perforated wall portion, tubular means extending interiorly in the rotor arranged to direct heat-softened mineral material from a supply into contact with the perforated wall portion, blower means for directing fluid under pressure into said tubular means in engagement with the heat-softened material in the tubular means, an internal combustion burner disposed within the spinner section formed with a substantially annular combustion chamber, means for feeding combustible mixture to the chamber, said burner having a peripheral wall substantially concentric with the spinner section formed with restricted orifice means through which hot gases of combustion from said chamber are projected radially outwardly toward the material at the peripheral wall of the spinner section.

2. Apparatus for processing heat-softenable mineral material including, in combination, a housing, a rotor disposed in the housing comprising a hollow sleeve section and a hollow spinner section, means for rotating the rotor, the spinner section being of lesser diameter than the sleeve section, the spinner section having a perforated wall portion, blower means providing a gaseous blast arranged to direct heat-softened material from a supply into contact with the perforated wall portion, a burner disposed within the spinner section, said burner being formed with an annularly shaped combustion chamber, means for feeding combustible mixture into the chamber, said burner having a peripheral wall substantially concentric with the spinner section, the peripheral wall of the burner being formed with restricted orifice means of undulated shape through which hot gases of combustion from said chamber are projected toward the material at the peripheral wall of the spinner section, the material at the wall being adapted to be projected through the perforations by centrifugal forces of rotation of the rotor, and a second blower providing a gaseous blast adapted to engage the projected material and attenuate the material to fibers.

3. Apparatus for processing heat-softened mineral material including, in combination, a housing, a rotor construction in said housing provided with a hollow sleeve section and a hollow spinner section, means for rotating the rotor construction, said spinner section being of lesser diameter than the sleeve section and formed with a perforated peripheral wall, pin and slot means removably securing the spinner section to the sleeve section, means for directing heat-softened mineral material from a supply into contact with the perforated wall, an internal combustion burner disposed within and spaced from the spinner section, said burner having a restricted peripheral orifice of undulated shape adapted to direct intensely hot gases of combustion radially of the axis of the spinner toward the material at the peripheral wall thereof throughout the major area of the wall, the material at the wall being adapted to be projected through the perforations by centrifugal forces of rotation of the rotor.

4. Apparatus for processing heat-softenable mineral material including, in combination, a housing, a hollow rotor disposed in the housing provided with a hollow sleeve section and a spinner section, said spinner section being of lesser diameter than the sleeve section, said sleeve section being formed with a plurality of circumferentially arranged recesses, means for directing gas under pressure into said recesses for rotating the sleeve and spinner sections, said spinner section having a perforated wall portion, means extending interiorly in the rotor arranged to direct heat-softened material from a supply into contact with the perforated wall portion, a combustion burner disposed in the spinner section having an annularly shaped combustion chamber, the outer circular wall of the chamber being formed with an undulated orifice adapted to direct the gases of combustion onto the material at the peripheral wall throughout the major area of the wall, the material at the wall being adapted to be projected through the perforations by centrifugal forces of rotation of the rotor.

5. Apparatus for processing heat-softened mineral material including, in combination, a rotor comprising a hollow cylindrical sleeve portion and a spinner portion, said spinner portion having a peripheral wall formed with a plurality of orifices, a housing surrounding the sleeve portion, said sleeve portion being formed with a frusto-conically shaped portion, an adjacent region of the housing being formed with a frusto-conically shaped portion, the frusto-conically shaped surfaces of said portions being of different angularities and converging outwardly of the axis of the rotor, a plurality of circumferentially spaced recesses formed in the sleeve portion of the rotor, means for delivering a fluid under pressure into said recesses whereby to rotate said rotor, said rotor being mounted for endwise movement whereby to provide for flow of the fluid outwardly between said frusto-conically shaped surfaces to the atmosphere and forming a cushion of the fluid adapted to support the rotor during rotation thereof, and means for delivering heat-softened mineral material into the spinner portion of the rotor and adjacent the perforated peripheral wall whereby the material is discharged outwardly through the orifices by centrifugal forces set up by rotation of the rotor.

6. Apparatus for processing heat-softenable mineral material including, in combination, a housing, a rotor comprising a hollow cylindrical sleeve section and a spinner section, said sleeve section being surrounded by said housing, said spinner section having a peripheral wall formed with a plurality of orifices, said sleeve section and said housing being formed with cooperating frusto-conically shaped portions of conveying angularities, a plurality of circumferentially spaced recesses formed in said sleeve section, means for delivering fluid under pressure into said recesses whereby to rotate the sleeve section, said sleeve section being mounted for free movement whereby said sleeve section is supported by the pressure fluid during rotation thereof and providing for the escape of fluid between the frusto-conically shaped portions, means for delivering heat-softened material into the spinner section of the rotor whereby the softened material is discharged outwardly through the orifices by centrifugal forces set up by rotation of the rotor to form elongated discrete bodies, and means for directing a gas stream into engagement with said bodies in a direction substantially normal to the outwardly moving bodies discharged from the spinner section.

7. Apparatus for processing heat-softened mineral material including, in combination, a housing, a rotor comprising a hollow cylindrical sleeve section and a spinner section, said sleeve section being surrounded by said housing, said spinner section having a peripheral wall formed with a plurality of orifices, said sleeve section and said housing being formed with cooperating frusto-conically shaped portions of converging angularities, a plurality of circumferentially spaced recesses formed in said sleeve section, means for delivering fluid under pressure into said recesses whereby to rotate the sleeve section, said sleeve section being mounted for endwise movement whereby said sleeve section is supported solely by the pressure fluid during rotation thereof, means including a blower for delivering heat-softened material from a supply into the spinner section, a combustion burner disposed within the spinner section and having a peripheral wall substantially concentric with the peripheral wall of the spinner section and formed with orifice means of undulated shape, said burner adapted to burn combustible mixture and the hot products of combustion projected through the orifice means onto the material in the spinner section.

8. Apparatus for forming fibers from heat-softenable material including, in combination, a rotor comprising a hollow cylindrical sleeve portion and a spinner portion, said spinner portion having a peripheral wall formed with a plurality of orifices, said sleeve portion being of larger diameter than the spinner portion, a housing surrounding the sleeve portion, one end of said sleeve portion being formed with a frusto-conically shaped portion, the adjacent region of the housing being formed with a frusto-conically shaped portion, the adjacent frusto-conically shaped surfaces of said portions being of different angularities and converging outwardly of the axis of the rotor, a plurality of recesses formed in the frusto-conical surface of the sleeve portion, means for delivering a fluid under pressure into the region between the frusto-conically shaped surfaces and angularly toward said recesses whereby to rotate said rotor, said rotor being mounted for free movement whereby to provide for flow of air outwardly between said surfaces to the atmosphere and forming a cushion of the fluid adapted to support the rotor during rotation thereof, tubular means disposed in the rotor spaced from the axis thereof for conveying heat-softened material from a supply to the interior surface of the perforated wall of the spinner portion, a blower associated with the tubular means for directing a stream of fluid into the tubular means for engagement with the heat-softened material, a combustion burner disposed within the spinner section having a peripheral region formed with orifice means, said burner adapted to burn combustible mixture whereby the products of combustion are delivered through the orifice means onto the material in the spinner section, the material at the wall of the spinner portion being adapted to be projected through the orifices in the wall to form primary filaments, and means establishing an annular gaseous blast engageable with the primary filaments to attenuate the filaments to fibers.

9. Apparatus for processing heat-softenable mineral material including, in combination, a housing, a hollow rotor disposed in the housing, means for rotating the rotor, said rotor provided with a spinner section having a perforated wall portion, means within the rotor arranged to guide heat-softened mineral material from a supply into contact with the perforated wall portion, a combustion burner disposed within the spinner section having a combustion zone defined by a walled chamber spaced from the rotor, means for feeding combustible mixture into the combustion zone adapted to be burned therein, and orifice means through which the hot gases of combustion from the combustion zone are projected outwardly toward the material at the perforated peripheral wall portion of the spinner section.

References Cited in the file of this patent
UNITED STATES PATENTS

| | | |
|---|---|---|
| 2,431,205 | Slayter | Nov. 18, 1947 |
| 2,603,539 | Brewster | July 15, 1952 |
| 2,603,833 | Stalego et al. | July 22, 1952 |
| 2,609,566 | Slayter et al. | Sept. 9, 1952 |
| 2,624,912 | Heymes et al. | Jan. 13, 1953 |
| 2,632,920 | Koehler | Mar. 31, 1955 |
| 2,752,196 | Chisholm et al. | June 26, 1956 |

FOREIGN PATENTS

| | | |
|---|---|---|
| 149,397 | Australia | Dec. 11, 1952 |
| 220,701 | Australia | May 22, 1958 |
| 1,154,476 | France | Nov. 4, 1957 |
| 571,807 | Germany | Mar. 6, 1933 |